United States Patent
Lee et al.

(10) Patent No.: US 11,205,787 B2
(45) Date of Patent: Dec. 21, 2021

(54) FUEL CELL CONTROL METHOD AND CONTROL SYSTEM

(71) Applicants: Hyundai Motor Company, Seoul (KR); Kia Motors Corporation, Seoul (KR)

(72) Inventors: Joon Yong Lee, Seoul (KR); Soon Woo Kwon, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 229 days.

(21) Appl. No.: 16/004,758

(22) Filed: Jun. 11, 2018

(65) Prior Publication Data
US 2019/0181465 A1    Jun. 13, 2019

(30) Foreign Application Priority Data
Dec. 12, 2017    (KR) .................. 10-2017-0170813

(51) Int. Cl.
| | |
|---|---|
| H01M 8/04089 | (2016.01) |
| H01M 8/04537 | (2016.01) |
| H01M 8/0438 | (2016.01) |
| H01M 8/04492 | (2016.01) |
| H01M 8/0432 | (2016.01) |
| H01M 8/04992 | (2016.01) |
| H01M 8/04746 | (2016.01) |
| H01M 8/04313 | (2016.01) |
| H01M 8/1018 | (2016.01) |

(52) U.S. Cl.
CPC ..... *H01M 8/04089* (2013.01); *H01M 8/0438* (2013.01); *H01M 8/04313* (2013.01); *H01M 8/04358* (2013.01); *H01M 8/04388* (2013.01); *H01M 8/04395* (2013.01); *H01M 8/04492* (2013.01); *H01M 8/04529* (2013.01); *H01M 8/04559* (2013.01); *H01M 8/04589* (2013.01); *H01M 8/04753* (2013.01); *H01M 8/04992* (2013.01); *H01M 2008/1095* (2013.01)

(58) Field of Classification Search
CPC ......... H01M 8/04089; H01M 8/04313; H01M 8/04358; H01M 8/0438; H01M 8/04388; H01M 8/04395; H01M 8/04492; H01M 8/04529; H01M 8/04559; H01M 8/04589; H01M 8/04753; H01M 8/04992
See application file for complete search history.

(56) References Cited

U.S. PATENT DOCUMENTS
8,405,399 B2    3/2013    Zhang et al.

FOREIGN PATENT DOCUMENTS
| CN | 1624490 A | * | 6/2005 | ............. G01R 31/36 |
| JP | 2014082115 A | * | 5/2014 | ........ H01M 8/04753 |
| JP | 201745549 A | * | 3/2017 | ............. H01M 8/04 |
| KR | 10-1293961 B1 | | 8/2013 | |
| KR | 10-2018-0067740 A | | 6/2018 | |

* cited by examiner

*Primary Examiner* — Helen Oi K Conley
(74) *Attorney, Agent, or Firm* — Mintz Levin Cohn Ferris Glovsky and Popeo, P.C.; Peter F. Corless (57) ABSTRACT

A fuel cell control method and are provided. The method includes collecting state data of a fuel cell stack and then estimating an effective catalytic amount of the fuel cell stack based on the collected state data. A fuel cell system is operated based on the estimated effective catalytic amount to thus optimize the efficiency of the system.

10 Claims, 5 Drawing Sheets

FUEL CELL CONTROL METHOD AND CONTROL SYSTEM

CROSS-REFERENCE TO RELATED APPLICATION

This application claims the priority benefit of Korean Patent Application No. 10-2017-0170813, filed on Dec. 12, 2017, the disclosure of which is incorporated herein by reference.

BACKGROUND

1. Field of the Invention

The present invention relates to a fuel cell control method and control system, and more particularly, to a technology for estimating an effective catalytic amount of a fuel cell stack to vary a pressure of hydrogen and oxygen supplied to a fuel cell stack and to control hydrogen and oxygen at a maximum efficiency driving point.

2. Description of the Related Art

Research has been actively conducted into hydrogen fuel cell vehicles using an environmentally friendly fuel cell as future alternative energy. A fuel cell generates electric energy via an electrochemical reaction using hydrogen as a reaction gas. In particular, air is supplied toward a cathode of a reaction surface and hydrogen is supplied toward an anode to generate thermal energy and electric energy via a reaction between hydrogen and oxygen at a reaction surface containing a catalyst.

However, when a voltage of a fuel cell stack is increased, —O or —OH is adsorbed onto a catalyst surface of a reaction surface to reduce a catalyst surface area and, when the voltage is re-dropped, —O or —OH is desorbed from the catalyst surface to increase a catalyst surface area (reversible degradation). When a fuel cell stack is exposed to a high voltage for a substantial period of time, catalyst is desorbed from a surface of a reaction surface (irreversible degradation).

Accordingly, when a catalyst surface area of a membrane-electrode assembly (MEA) is reduced, even when a fuel cell stack outputs the same current, a voltage is decreased. In other words, generated electric energy is decreased and thermal energy is increased, degrading output performance and, as a result, power generating efficiency is reduced. Accordingly, there is a need for an appropriate fuel cell driving method of estimating a catalyst surface area of an MEA to enhance output performance and generating efficiency.

The matters disclosed in this section is merely for enhancement of understanding of the general background of the invention and should not be taken as an acknowledgment or any form of suggestion that the matters form the related art already known to a person skilled in the art.

SUMMARY

Therefore, the present invention provides a method of estimating an effective catalytic amount for reaction between hydrogen and oxygen to pressurize hydrogen or air based thereon and to control hydrogen or air.

In accordance with an aspect of the present invention, the above and other objects may be accomplished by the provision of a fuel cell control method that may include collecting state data of a fuel cell stack, estimating an effective catalytic amount of the fuel cell stack based on the collected state data, and optimizing efficiency of a fuel cell system based on the estimated effective catalytic amount.

The state data of the fuel cell stack of the collecting may include electrode membrane water content, air electrode pressure, hydrogen electrode pressure, coolant temperature, and stack current. The estimating of the effective catalytic amount may include substituting the collected state data into a voltage calculation equation to derive a mathematical voltage model and approximating the derived mathematical voltage model to a measured voltage to estimate the effective catalytic amount.

Additionally, the optimizing of the fuel cell system efficiency may include adjusting a pressure of hydrogen or air supplied to the fuel cell stack. The optimizing may further include calculating a target hydrogen supply pressure or a target oxygen supply pressure at which the efficiency of the fuel cell system is maximized, based on the estimated effective catalytic amount, and adjusting a pressure of hydrogen or air to follow the calculated target hydrogen supply pressure or target oxygen supply pressure. The optimizing may include adjusting a pressure of hydrogen or air based on a gain value and a loss value as hydrogen or air supplied to the fuel cell stack is pressurized.

The gain value may be calculated using an increased amount of an output voltage along with pressurization of hydrogen or air at the same output current of the fuel cell stack. The loss value may be calculated using an increased amount of hydrogen that crosses over to a cathode from an anode of the fuel cell stack and an increased amount of power consumed in a balance of plant (BOP) as hydrogen or air supplied to the fuel cell stack is pressurized. Additionally, the optimizing of the system efficiency may include controlling fuel cell system efficiency calculated via multiplication of hydrogen utilization, stack efficiency, and BOP efficiency to be maximized.

The hydrogen utilization may be calculated as a ratio of a reacted hydrogen amount and the sum of a reacted hydrogen amount for a predetermined reference time, a crossover hydrogen amount, and a purged hydrogen amount. The stack efficiency may be calculated as a ratio of an ideal voltage in the same output current of the fuel cell stack and a currently measured voltage of the fuel cell stack. The BOP efficiency may be calculated as a value obtained by subtracting power consumed in a BOP from output power of the fuel cell stack with respect to the output power of the fuel cell stack.

In accordance with another aspect of the present invention, the above and other objects may be accomplished by the provision of a fuel cell control system including a fuel cell stack, a sensor configured to collect state data of a fuel cell stack, and a controller configured to estimate an effective catalytic amount of the fuel cell stack based on the collected state data and to optimize efficiency of a fuel cell system based on the estimated effective catalytic amount.

The fuel cell control system may further include an air processing system configured to supply air to the fuel cell stack, and a fuel processing system configured to supply hydrogen to the fuel cell stack. The controller may be configured to calculate a target hydrogen supply pressure or a target oxygen supply pressure at which the efficiency of the fuel cell system is maximized, based on the estimated effective catalytic amount, and operate the air processing system or the fuel processing system to follow the calculated target hydrogen supply pressure or target oxygen supply pressure.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In exemplary embodiments of the present invention disclosed in the specification, specific structural and functional descriptions are merely illustrated for the purpose of illustrating embodiments of the invention and exemplary embodiments of the present invention may be embodied in many forms and are not limited to the embodiments set forth herein.

Exemplary embodiments of the present invention may be variously changed and embodied in various forms, in which illustrative exemplary embodiments of the invention are shown. However, exemplary embodiments of the present invention should not be construed as being limited to the exemplary embodiments set forth herein and any changes, equivalents or alternatives which are within the spirit and scope of the present invention should be understood as falling within the scope of the invention It will be understood that although the terms first, second, third etc. may be used herein to describe various elements, these elements should not be limited by these terms. These terms are only used to distinguish one element from another element. For example, a first element may be termed a second element and a second element may be termed a first element without departing from the teachings of the present invention.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements or layers should be interpreted in a like fashion, e.g., "between," versus "directly between," "adjacent," versus "directly adjacent," etc.

The terms used in the present specification are used for explaining a specific exemplary embodiment, not limiting the present inventive concept. Thus, the singular expressions in the present specification include the plural expressions unless clearly specified otherwise in context.

Unless otherwise defined, all terms including technical and scientific terms used herein have the same meaning as commonly understood by one of ordinary skill in the art to which this inventive concept pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
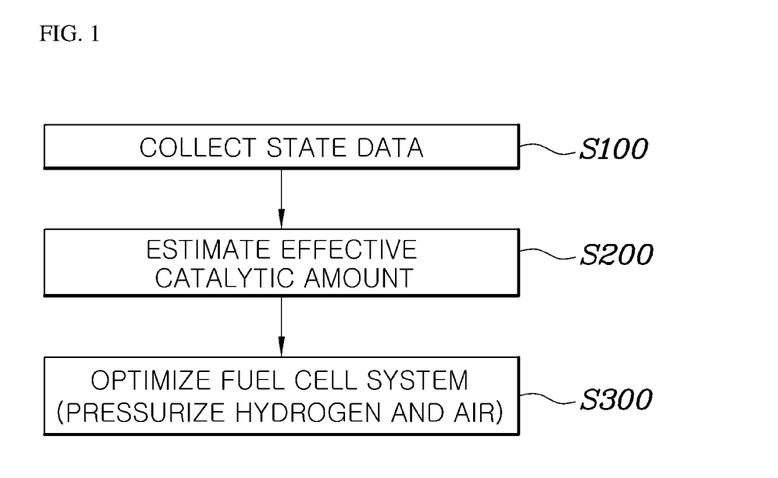
FIG. 1 is a flowchart of a fuel cell control method according to an exemplary embodiment of the present invention.

Reference will now be made in detail to the exemplary embodiments, examples of which are illustrated in the accompanying drawings. In the drawings, the same reference numerals in the drawings denote the same element. FIG. 1 is a flowchart of a fuel cell control method according to an exemplary embodiment of the present invention. The method described herein below may be executed by a controller having a processor and a memory.

Referring to FIG. 1, the fuel cell control method according to an exemplary embodiment of the present invention may include collecting state data of a fuel cell stack (S100); estimating an effective catalytic amount of the fuel cell stack based on the collected state data (S200); and optimizing efficiency of a fuel cell system based on the estimated effective catalytic amount (S300).

In particular, in the collecting of data (S100), the state data of the fuel cell stack may include electrode membrane water content, air pressure of a cathode, hydrogen pressure of an anode, coolant temperature, and stack current. This information may be collected using various sensors. Additionally, in the estimating of the effective catalytic amount (S200), the collected state data may be substituted into a voltage calculation equation to derive a mathematical voltage model and the derived mathematical voltage model may be approximated to a measured voltage to estimate the effective catalytic amount. In particular, the present invention proposes a method of acquiring an appropriate parameter value via comparison between a mathematical estimation model and a realistic model of an output voltage of a fuel cell and operating a fuel cell system based on the parameter value to derive optimum efficiency and to prevent degradation of the fuel cell.

First, the state data may include electrode membrane water content, air electrode pressure, hydrogen electrode pressure, coolant temperature, and stack current may be collected. Particularly, the electrode membrane water content may be an amount of water contained in an electrode membrane and may be acquired through measuring relative humidity of an outlet end of the air electrode of the fuel cell. Since the electrode membrane water content is proportional to relative humidity, the electrode membrane water content may be derived via multiplication of a simple constant or by pre-storing a mathematical formula and substituting relative humidity into the mathematical formula. The relative humidity of the outlet end of the air electrode may also be measured by installing a sensor and, but is not limited thereto. The relative humidity may be estimated using known method of the related art.

The air electrode pressure and the hydrogen electrode pressure may be measured using various sensors mounted on the air electrode and the hydrogen electrode, respectively, and the coolant temperature may also be measured via a coolant line that circulates coolant in a fuel cell. In addition, the stack current may be measured by a current sensor.

The state data that is obtained as described above may be substituted into or applied to the voltage calculation equation to estimate the effective catalytic amount. The voltage calculation equation may refer to a mathematical formula obtained by indirectly calculating a voltage output from a fuel cell with various inputs values. In the voltage calculation equation, a mathematical voltage $V_m$ may be calculated by subtracting activation loss $V_{act}$, resistance loss $V_{ohm}$, and concentration loss $V_{con}$ from thermodynamic theoretical voltage E that has no loss according to Equation 1 below. The activation loss $V_{act}$ is generated to decrease activation energy for causing a reaction and the resistance loss $V_{ohm}$ is generated due to moving resistance of ions in electrolyte and moving resistance of electrons in an electrode, a gas diffusion layer, and a separating plate. The concentration loss $V_{con}$ is generated due to insufficient capability to maintain average initial concentration of average fluid along with consumption of a reactant in an electrode via an electrochemical reaction.

Equation 1

$$V_m = \frac{-\Delta G}{2F} + \frac{R_u T}{nF} \ln\left(\frac{\left(\frac{P_a - \phi P_{H_2O\_sat}}{P_a^0}\right)\left(\frac{P_c - \phi P_{H_2O\_sat}}{P_c^0}\right)^{0.5}}{a_{H_2O}}\right) -$$

-continued $$\frac{R_u T}{\alpha n F} \ln\left(\frac{i + i_{in}}{i_{0,ref} A_c L_c \left(\frac{P_c - \phi P_{H_2O\_sat}}{P_c^0}\right)^{0.5} e^{\frac{E_Q}{R}\left(\frac{1}{T} - \frac{1}{298.15}\right)}}\right) -$$

$$(i + i_{in})\left(R_a + \frac{t_m}{0.005139(0.043 + 17.81\phi - 39.85\phi^2 + 36\phi^3) - 0.00326} e^{1268\left(\frac{1}{T} - \frac{1}{303}\right)}\right) +$$

$$d \frac{R_u T}{nF} \ln\left(1 - \frac{i + i_{in}}{D_{0,ref} \frac{T^{0.5}}{T_0^{1.5}} \left(\frac{P_c - \phi P_{H_2O\_sat}}{P_c^0}\right)}\right)$$

$$i = \frac{I_{FC}}{A_c}$$

P: pressure, kPa
$P_{sat}$: saturation pressure, kPa
F: Faraday's constant, 96,487 C/mol
$R_u$: universal gas constant, 8.314 J/mol/K
T: temperature, K
$T_c$: temperature, ° C.
E: ideal cell potential, V
R: resistance
i: current density, (A/cm2)
D: diffusivity
$A_c$: catalyst specific area
$L_c$: catalyst loading
$E_c$: activation energy, 66 kJ/mol.
V: potential, V
d: concentration coefficient
n: number of electron per molecule of hydrogen, 2
$i_{in}$: internal current density, (A/cm2)
$i^L$: limiting current, density, (A/cm2)
$t_m$: thickness of membrane
$K_m$: ion conductance of membrane
$P_a$: pressure of anode
$P_c$: pressure of cathode,
$a_{H2O}$: activity of water
$P_{H2O,\,sat}$: saturated water vapor pressure
$R_m$: resistance of membrane
$R_a$: resistance of rest of cell
F: Faraday constant, 96487 (C/mol)
G: Gibbs free energy, (J)
θ: relative humidity
α: transfer coefficient
a: water activity
t: thickness
δ: diffusion distance
ε: porosity,
λ: percentage of water content of membrane
Subscripts
H2: hydrogen
O2: oxygen
H2O: water
ref: reference condition (298.15K, 101.25 kPa)
m: membrane Furthermore, the measured and estimated state data are substituted into the above mathematical formula to obtain voltage value $V_m$ with respect to specific current density i and the voltage value $V_m$ may be represented in the form of a graph with the x axis representing current density and the Y axis representing cell voltage to derive a mathematical voltage model.

The above mathematical formula includes several parameters, i.e., effective catalytic amount $A_c$, catalyst loading data $L_c$, and internal current density $i_{in}$. Accordingly, the remaining parameters may be fixed to an initially substituted value and only one parameter may be variously changed and substituted into the mathematical formula to match the mathematical voltage model with a plot shape of a measured voltage. In this regard, a parameter value at a time point when the mathematical voltage model is similar to the plot shape of the measured voltage may be a target parameter value. Using such graph fitting, an effective catalytic amount $A_c$ and catalyst loading data $L_c$ may be derived.

In particular, the effective catalytic amount may be changed to match the mathematical voltage model with the measured voltage to estimate an effective catalytic amount that corresponds to when the mathematical voltage model is approximated to the measured voltage. A voltage obtained by changing the effective catalytic amount may be obtained as a more accurate voltage when a minimum cell voltage is used as a reference. In other words, in the case of the mathematical voltage model estimated by changing the effective catalytic amount, a mathematical voltage model may be obtained with respect to a minimum cell voltage, a comparison target, that is, an actually measured minimum cell voltage, may be defined as a measured voltage, and the mathematical voltage model with respect to the minimum cell voltage and the comparison target may be compared to estimate the effective catalytic amount.

Figure 2A:
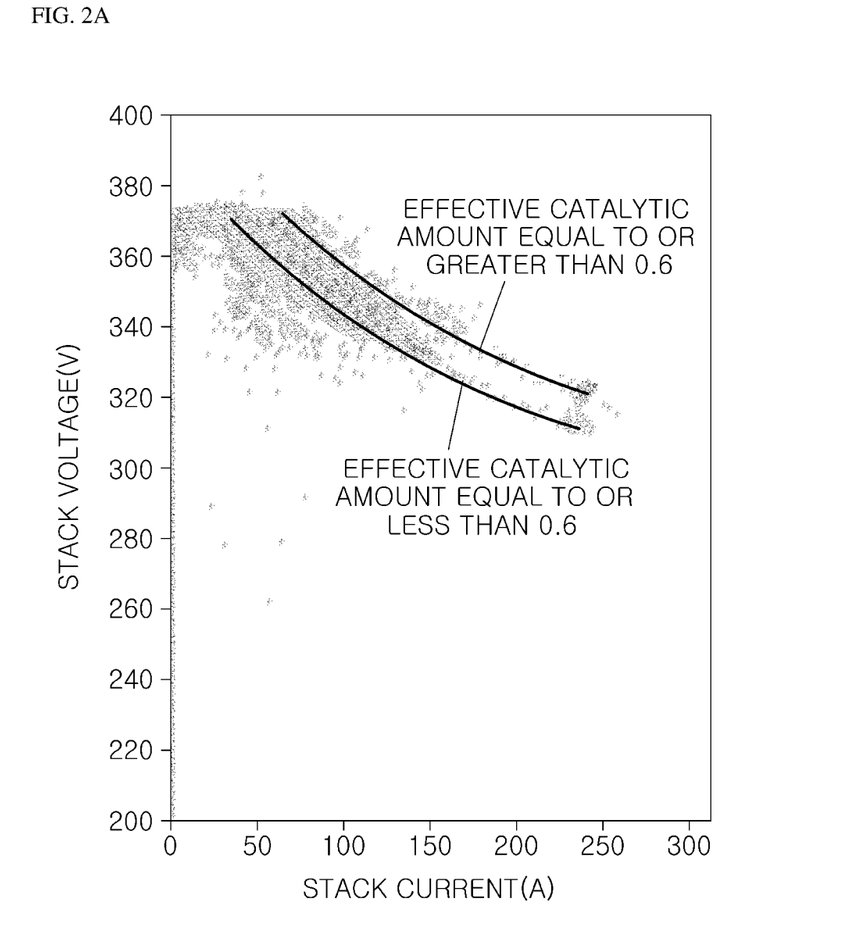
FIG. 2A is a diagram showing an I-V curve of fuel cell stacks with different effective catalytic amounts and FIG. 2B is a diagram showing efficiency of a fuel cell system with different effective catalytic amounts depending on stack current according to an exemplary embodiment of the present invention.
Figure 2B:
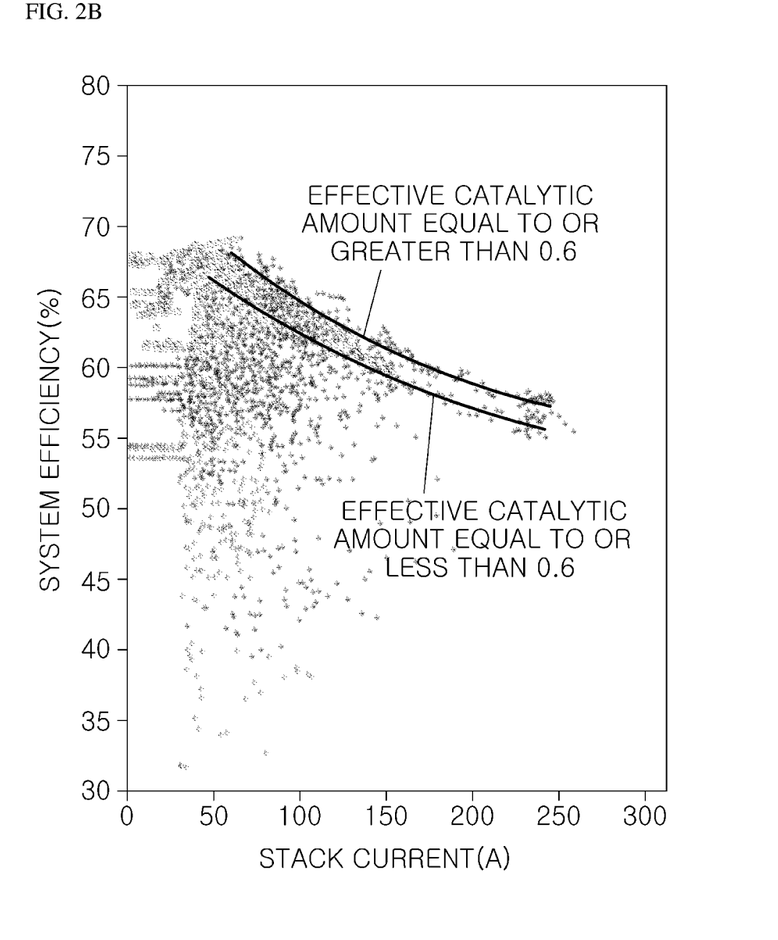

Moreover, the optimizing of the efficiency of the fuel cell system (S300) may be performed by operating a system of a fuel cell vehicle based on the estimated effective catalytic amount to overcome or predict high humidity of a fuel cell. FIG. 2A is a diagram showing an I-V curve of fuel cell stacks with different effective catalytic amounts. FIG. 2B is a diagram showing efficiency of a fuel cell system with different effective catalytic amounts depending on stack current. FIGS. 2A and 2B are analysis graphs using data obtained during driving on an actual road.

Referring to FIG. 2A, along with reduction in an effective catalytic amount inside a fuel cell stack, an I-V curve of a fuel cell stack may be moved downward. In other words, as an effective catalytic amount is reduced, performance of a fuel cell stack may be degraded and, thus, generated power tends to be reduced. As shown in FIG. 2B, comparing a case in which an effective catalytic amount is equal to or greater than 0.6 and a case in which the effective catalytic amount is equal to or less than 0.6, efficiency of a fuel cell system is decreased by about 2 to 3%.

Accordingly, the output performance and efficiency of the fuel cell system may be changed by varying the effective catalytic amount and, accordingly, the effective catalytic amount may be varied and, in this case, it may be necessary to vary a maximum efficiency driving point at which efficiency of the fuel cell system is maximized. In other words, conventionally, when a hydrogen supply pressure or air supply pressure supplied to a fuel cell stack are adjusted, output current, temperature, and the like of the fuel cell stack may be used as a parameter. The present invention relates to a strategy of adjusting a hydrogen supply pressure or an air supply pressure using the estimated effective catalyst amount in addition to an existing parameter.

Figure 3:
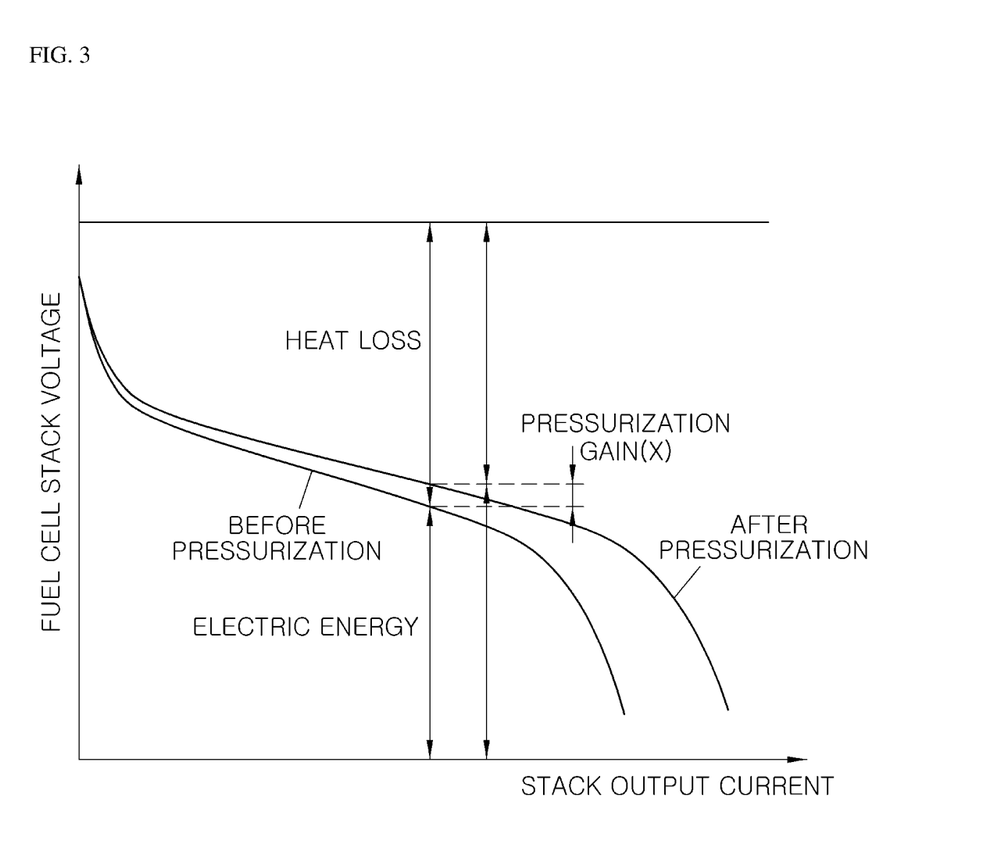
FIG. 3 is a diagram showing an I-V performance curve of a fuel cell stack, varied according to pressurization control according to an exemplary embodiment of the present invention.

FIG. 3 is a diagram showing an I-V performance curve of a fuel cell stack, varied according to pressurization control. FIG. 3 shows I-V curves before and after pressurization control of pressurizing hydrogen or air supplied to a fuel cell stack. In other words, FIG. 3 shows that a performance curve is moved upward according to pressurization control. In particular, a relatively high voltage may be achieved under a condition of the same stack output current and, accordingly, heat loss is decreased and electric energy (generated power) is increased.

In the optimizing (S300), a pressure of hydrogen or air supplied to the fuel cell stack may be adjusted to maximize efficiency of a fuel cell system. In addition, in the optimizing (S300), a target hydrogen supply pressure or a target oxygen supply pressure at which efficiency of a fuel cell system is maximized may be calculated based on the estimated effective catalytic amount and a pressure of hydrogen or air may be adjusted to correspond to the calculated target hydrogen supply pressure or target oxygen supply pressure. In the optimizing (S300), the pressure of hydrogen or air may be adjusted based on a gain value and a loss value along with pressurization of hydrogen or air supplied to the fuel cell stack.

The gain value may be calculated using an increased amount of an output voltage along with pressurization of hydrogen or air at the same output current of the fuel cell stack. In other words, the gain value may be calculated as a pressurization gain X as an increased amount of electric energy, as shown in FIG. 3. The loss value may be calculated using an increased amount of hydrogen that crosses over to a cathode from an anode of the fuel cell stack and an increased amount of power consumed in a balance of plant (BOP) as hydrogen or air supplied to the fuel cell stack is pressurized. The loss value may be calculated as the sum of power that corresponds to the increased amount of the hydrogen that crosses over and the increased amount of power consumed in the BOP.

A partial pressure of hydrogen that crosses over to the cathode from the anode of the fuel cell stack may be increased, in particular, according to pressurization control of pressurizing hydrogen and, accordingly, an amount of hydrogen that crosses over the cathode may be increased. Power that corresponds to a crossover hydrogen amount increased via pressurization control may be calculated. In particular, the power may be calculated using fuel efficiency that is a relationship between a supplied hydrogen amount and generated power. The increased amount of power consumed in the BOP may refer to, in detail, revolutions per minute (RPM) of an air compressor operated for pressurization control or power that is additionally consumed in a hydrogen fuel ejector.

Furthermore, in the optimizing (S300), fuel cell system efficiency calculated via multiplication of hydrogen utilization, stack efficiency, and BOP efficiency may be controlled to be maximized. The fuel cell system efficiency may be calculated via multiplication of hydrogen utilization, stack efficiency, and BOP efficiency.

$$\eta_{system} = \eta_{H_2\text{-}Utilization} \eta_{stack} \eta_{aux}$$

$\eta_{system}$: Fuel cell system efficiency, $\eta_{H_2\text{-}Utilization}$: Hydrogen utilization, $\eta_{stack}$: Stack efficiency, $\eta_{aux}$: BOP efficiency In particular, the hydrogen utilization may be calculated as a ratio of a reacted hydrogen amount and the sum of a reacted hydrogen amount for a predetermined reference time, the crossover hydrogen amount, and a purged hydrogen amount, the stack efficiency may be calculated as a ratio of an ideal voltage in the same output current of a fuel cell stack and a currently measured voltage of the fuel cell stack, and the BOP efficiency may be calculated as a ratio of a value obtained by subtracting power consumed in a BOP from output power of the fuel cell stack with respect to the output power of the fuel cell stack.

For example, the hydrogen utilization may be calculated as follows.

$$\eta_{H_2-Utilization} = \frac{\frac{1}{T}\int_O^T (\eta_{H_2 React}(t))dt}{\frac{1}{T}\int_O^T (\eta_{H_2 React}(t) + \eta_{H_2,XO}(t) + \eta_{H_2,Purge}(t))dt}$$

$\eta_{H_2-Utilization}$:Hydrogen utilization,$\eta_{H_2,React}$:Hydrogen flow[mol/s] consumed via reaction,$\eta_{H_2,XO}$: Crossover hydrogen flow[mol/s],$\eta_{H_2,Purge}$: Purged hydrogen flow[mol/s]

The hydrogen flow $\eta_{H_2, React}$ consumed via reaction may be calculated from output current of a stack as follows.

$$\eta_{H_2,React} = \frac{I_{FC}}{n \times F}$$

$I_{FC}$: Output current [A] of fuel cell stack, n: Number of electrons per molecule (in the case of hydrogen, n=2), F: Faraday constant (96487 [C/mol])

For example, the stack efficiency may be calculated as follows.

$$\eta_{stack} = \frac{V}{E_0}$$

$\eta_{stack}$: Stack efficiency, V: Currently measured output voltage (V) of fuel cell stack, $E_0$: Ideal electromotive force [V] in current output current.

A higher output voltage is generated at the same output current according to pressurization control of hydrogen or air and, thus, a gain value according to pressurization control may be represented as an increase in stack efficiency. For example, BOP efficiency may be calculated as follows.

$$\eta_{aux} = \frac{VI_{FC} - P_{BOP}}{VI_{FC}}$$

$\eta_{aux}$: BOP efficiency, V: Currently measured output voltage [V] of fuel cell stack, $I_{FC}$: Output current [A] of fuel cell stack, $P_{BOP}$: Power [kW] consumed in BOP Power is additionally consumed in a BOP such as an air compressor according to pressurization control of hydrogen or air and, accordingly, a loss value according to pressurization control may be represented as a decrease in BOP efficiency. Accordingly, optimization control of variably adjusting a supply pressure of hydrogen and air supplied to a fuel cell stack may be performed to maximize fuel cell system efficiency based on the estimated effective catalytic amount of the fuel cell stack.

Particle swarm optimization (PSO) for optimization in real time via repeated learning may be used. The fuel cell system efficiency may be varied by a hydrogen-pressurized amount and an air-pressurized amount. In particular, N driving points may be generated based on the hydrogen-pressurized amount and the air-pressurized amount, driving may be performed for a predetermined driving time for each of the N driving points to store fuel cell system efficiency, and N efficiencies of the fuel cell system may be compared to set an optimum driving point as an optimum point. An initial optimum point may be initially learned during driving using a constant that is tuned while a vehicle is manufactured and driving may be performed during next learning under a condition at the learned optimum point.

Figure 4:
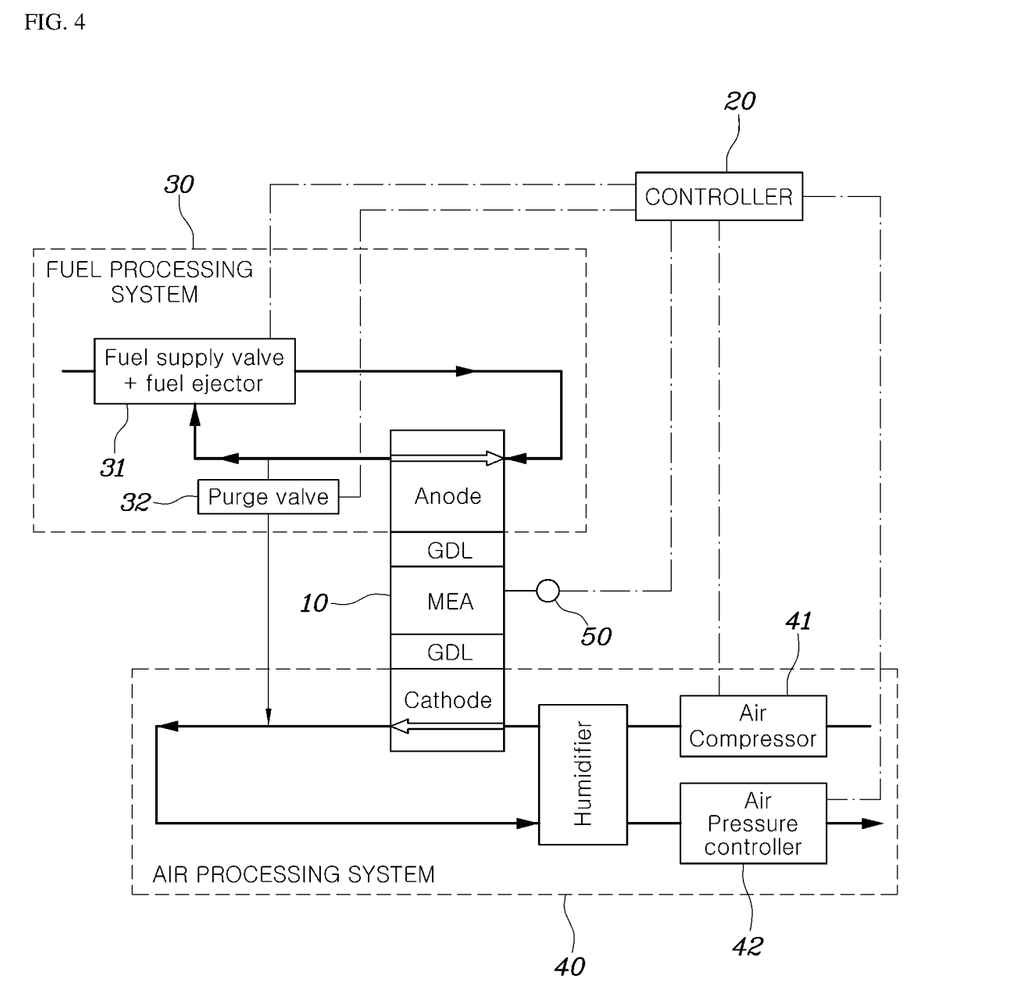
FIG. 4 is a diagram showing a structure of a fuel cell control system according to an exemplary embodiment of the present invention.

FIG. 4 is a diagram showing a structure of a fuel cell control system according to an exemplary embodiment of the present invention. Referring to FIG. 4, the fuel cell control system according to an exemplary embodiment of the present invention may include a fuel cell stack 10, a sensor 50 configured to collect state data of the fuel cell stack, and a controller 20 configured to estimate an effective catalytic amount of the fuel cell stack 10 based on the collected state data and optimize fuel cell system efficiency based on the estimated effective catalytic amount.

The sensor 50 may refer to various sensors configured to collect state data of the fuel cell stack and may include any of a pressure sensor, a temperature sensor, or a current sensor, configured to collect state data of the fuel cell stack, which includes electrode membrane water content, an air electrode pressure, a hydrogen electrode pressure, a coolant temperature, and stack current.

The fuel cell control system may further include an air processing system 40 configured to supply air to the fuel cell stack 10, and a fuel processing system 30 configured to supply hydrogen to the fuel cell stack 10 and the controller 20 may be configured to operate the air processing system 40 or the fuel processing system 30 to calculate a target hydrogen supply pressure or a target oxygen supply pressure at which efficiency of a fuel cell system is maximized based on the estimated effective catalytic amount and to correspond to the calculated target hydrogen supply pressure or target oxygen supply pressure.

The fuel processing system 30 may be a system configured to supply hydrogen to the fuel cell stack 10 and supply hydrogen stored in a hydrogen tank to an anode of the fuel cell stack 10 and re-circulate or purge discharged hydrogen. In particular, to vary a hydrogen supply pressure, the controller 20 may be configured to operate a fuel supply valve and a fuel ejector 31 or may be configured to simultaneously operate a purge valve 32 to be operatively associated therewith.

The air processing system 40 may be a system configured to supply air to the fuel cell stack 10 and may allow external air to be introduced thereto, may be configured to supply the air to a cathode of the fuel cell stack 10, and externally discharge the air. In particular, to vary an air supply pressure, the controller 20 may be configured to adjust rotational speed of an air compressor 41 or simultaneously operate an air pressure controller 42. The air pressure controller 42 may be an air control valve (ACV) disposed at an air outlet and may be configured to adjust an air pressure by adjusting an opening degree of an air control valve.

Hereinafter, a repeated description of the fuel cell control method is omitted. As is apparent from the above description, according to a fuel cell control method and control system according to the present invention, a hydrogen or air pressure may be varied depending on an effective catalytic amount of a fuel cell stack to enhance output performance of a fuel cell. In addition, a fuel cell system may be driven at maximum efficiency to enhance generating efficiency of a fuel cell system, thereby enhancing fuel efficiency.

Although the exemplary embodiments of the present invention have been described above with reference to the accompanying drawings, those skilled in the art will appreciate that the present invention can be implemented in various other exemplary embodiments without changing the technical ideas or features thereof.

What is claimed is:

1. A fuel cell control method, comprising:
   collecting, by a controller, state data of a fuel cell stack;
   estimating, by the controller, an effective catalytic amount of the fuel cell stack to derive a mathematical voltage model based on the collected state data; and
   operating, by the controller, a fuel cell system based on the estimated effective catalytic amount to optimize efficiency of the fuel cell system,
   wherein the state data of the fuel cell stack of the collecting includes electrode membrane water content, air pressure of a cathode, hydrogen pressure of an anode, coolant temperature, and stack current, and
   wherein the estimating of the effective catalytic amount includes:
   applying, by the controller, the collected state data into a voltage calculation equation and approximating the derived mathematical voltage model to a measured voltage to estimate the effective catalytic amount.

2. The method according to claim 1, wherein the optimizing includes:
   adjusting, by the controller, a pressure of hydrogen or air supplied to the fuel cell stack to maximize efficiency of the fuel cell system.

3. The method according to claim 2, wherein the optimizing includes:
   calculating, by the controller, a target hydrogen supply pressure or a target oxygen supply pressure at which the efficiency of the fuel cell system is maximized, based on the estimated effective catalytic amount; and
   adjusting, by the controller, a pressure of hydrogen or air to follow the calculated target hydrogen supply pressure or target oxygen supply pressure.

4. The method according to claim 2, wherein the optimizing includes:
   adjusting, by the controller, a pressure of hydrogen or air based on a gain value and a loss value as hydrogen or air supplied to the fuel cell stack is pressurized.

5. The method according to claim 4, wherein the gain value is calculated using an increased amount of an output voltage along with pressurization of hydrogen or air at the same output current of the fuel cell stack.

6. The method according to claim 4, wherein the loss value is calculated using an increased amount of hydrogen that crosses over to a cathode from an anode of the fuel cell stack and an increased amount of power consumed in a balance of plant (BOP) as hydrogen or air supplied to the fuel cell stack is pressurized.

7. The method according to claim 1, wherein the optimizing includes:
   adjusting, by the controller, the efficiency of the fuel cell system calculated via multiplication of hydrogen utilization, stack efficiency, and BOP efficiency to be maximized.

8. The method according to claim 7, wherein the hydrogen utilization is calculated as a ratio of a reacted hydrogen amount and the sum of a reacted hydrogen amount for a predetermined reference time, a crossover hydrogen amount, and a purged hydrogen amount.

9. The method according to claim 7, wherein the stack efficiency is calculated as a ratio of an ideal voltage in the same output current of the fuel cell stack and a currently measured voltage of the fuel cell stack.

10. The method according to claim 7, wherein the BOP efficiency is calculated as a value obtained by subtracting power consumed in a BOP from output power of the fuel cell stack with respect to the output power of the fuel cell stack.

* * * * *